April 24, 1962 W. MEYER 3,030,851
MOUNTAINEERING ROPES
Filed Feb. 8, 1960
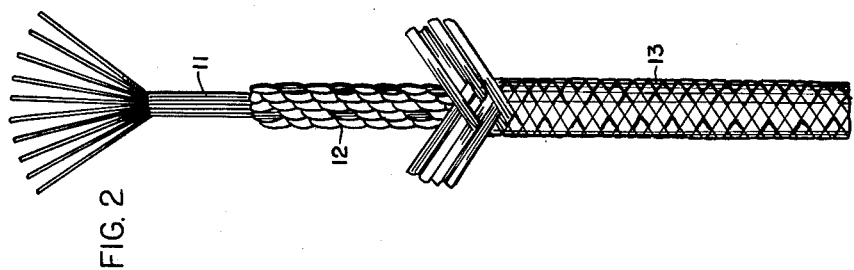
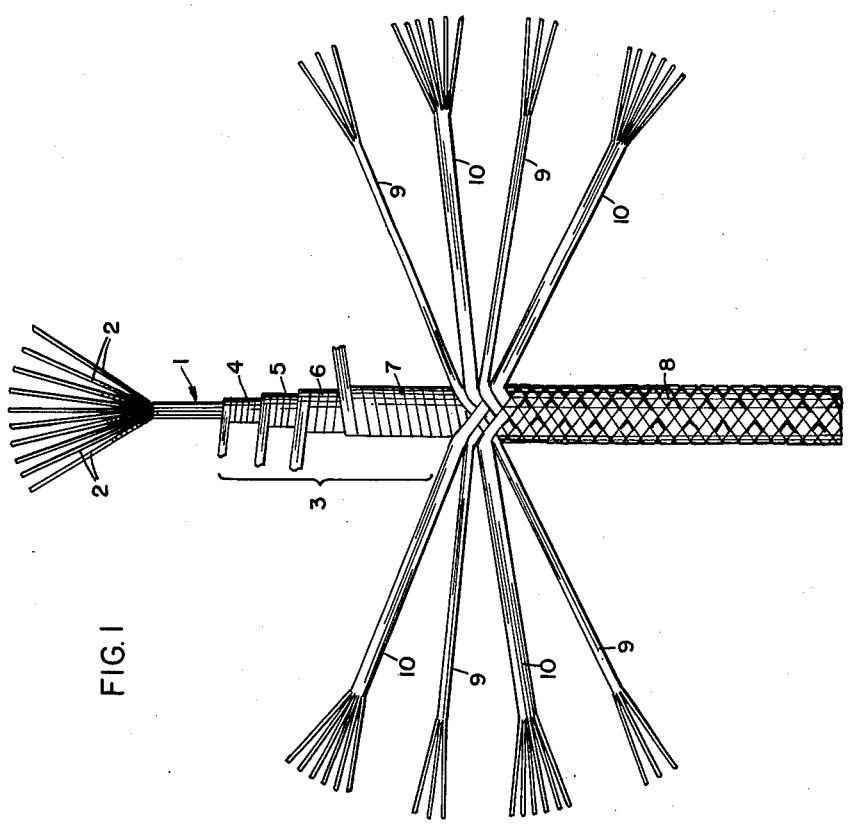
INVENTOR:
WILHELM MEYER
BY
ATT'YS

United States Patent Office 3,030,851
Patented Apr. 24, 1962

3,030,851
MOUNTAINEERING ROPES
Wilhelm Meyer, Wuppertal-Barmen, Germany, assignor to Vereinigte Glanzstoff-Fabriken Aktiengesellschaft, Wuppertal-Elberfeld, Germany
Filed Feb. 8, 1960, Ser. No. 7,192
Claims priority, application Germany Feb. 6, 1959
4 Claims. (Cl. 87—6)

The present invention relates to ropes especially useful in mountain climbing, which ropes, by their special construction and by the type of materials used, meet two entirely different demands for mountaineering safety ropes. These demands are (a) low elasticity under ordinary tension strains on the rope and (b) high elasticity under shock loading to absorb in the rope a portion of the strain on the human body in the event of a fall.

Good mountaineering ropes, as is well known, must be capable of withstanding a variety of widely different strains. In the usual climbing work, the rope strain is predominantly tensile strain, sometimes also with bending strains, under relatively steady load. In the case of an accidental fall, however, the rope must absorb a high shock load.

In ordinary climbing, a rope elasticity as low as possible is desired. An inelastic climbing rope better enables the following climber to follow precisely every movement of the leader. A rope with high elasticity absorbs all or part of the movements of the leader. Signals given under some circumstances via the rope to the following climber can be absorbed by the elastic rope to an extent that they reach him only indistinctly or even unintelligibly. High elasticities of the rope, accordingly, are undesirable for proper teamwork in mountain climbing. In especially unfortunate situations, high rope elasticities may even endanger the lives of a whole rope team.

In the case of a plunge, however, an adequate shock load absorption by the rope, and, accordingly, a high elasticity, are necessary, to prevent the rope tension from exceeding a safe limit at the moment of shock absorption. This tension is limited, on the one hand, by the breaking strength of the rope, and, on the other hand, by the capacity, principally, of the human body to absorb shock-type pressure loads, such as occur, for example, in breaking the fall of a climber by the rope. The rope forces applied to the body of the falling climber at the moment of breaking of the fall should not be of a magnitude that, with intact rope, the life of the falling climber is endangered by possible bone fractures. Under ordinary circumstances, a skilled leader can guard dynamically against such dangers in case of a fall by wrapping, for example, the rope around his hips—thereby giving a braking friction against the rope to catch the falling person with less shock. Besides strength and skill however, this requires the mastery of the technique in question, as, for example, hip bracing.

Quite different conditions are involved, however, under circumstances of static rope guarding, by which is meant the unyielding and rigid anchoring of the rope in the rope portion running from the spring safety hook to the following climber. In the event of a fall with the rope secured in this manner, the entire shock absorption of the plunge has to be furnished by the stretch and elasticity of the rope itself. Hitherto, especially with climbing ropes made of natural fibers, the rigid anchoring of the rope presents the greater danger to breakage of the rope and thereby the fall of the leader.

For reasons of safety, accordingly, the mountain climbing team, at least in the case of difficult ascents, actually ought to take along two ropes of different types, namely, one rope with very low elasticity and another with high elasticity. This, however, has obvious practical difficulties.

I have discovered that, by a special rope construction with suitable raw materials, it is possible to provide a mountaineering rope which, under the usual, moderate, tensile load strains is only slightly elastic and which, under high shock load, absorbs the shock load in stages with a high breaking elasticity in the last stage. Such a rope is produced in three parts with the inner parts made from yarns of completely synthetic filaments of high strengths, while the mantle may consist of natural or synthetic fiber yarns. The inner part is composed of axially or longitudinally directed yarns, called the inner core in the following, and has low elasticity. The second portion of the rope, referred to hereinafter as the core sheath, has a very high elasticity. The outer portion, the mantle, is braided about the core sheath and has an elasticity lower than the sheath. The core sheath has a very high shock load capicity, while the mantle and core are weaker in this respect than the core sheath.

By tests and calculations, the strength and elasticity limit requirements which a mountaineering rope according to the invention must have were determined. In the present ropes, the tensile strain in the climbing is carried exclusively by the low-elasticity interior core. Its load capacity must correspond to three times the body weight of the mountain climber—assumed to be about 175 lbs. as an average figure—giving a figure of about 525 lbs. In view of an experimentally-determined strentgh decrease of 40% due to bending strain of the rope in the safety hook, the strength of all the yarns in the core must amount to about 875 lbs. The elongation at break of the inner core—the percent elongation before breakage—should not exceed 10%. In consequence of this low elasticity, in the case of a moderate pulling strain on the rope, essentially the core alone carries the load. Hence, there is very small elastic stretch in the rope under loads in the ordinary stages of mountain climbing.

With regard to the requirements of load capacity of the core sheath, it is necessary to calculate on the basis of the maximum strain which the human body can bear without harm. As has been determined by extensive experiments, e.g., Grundriss für Flugmedizin by Strughold, 3rd edition, edited by Prof. Dr. med. Ruff, Armbrosius Barth Press, Munich, this maximum is approximately 2650 lbs.

For the calculation of the elongation at break required of the core sheath, the following considerations apply:

The working capacity of a rope is the product of the shock load capacity ($P$) times the elongation at break ($D$) times the safety factor ($e$). The latter lies between 0.5 and 0.33, and, for reasons of safety, is set herein at 0.33. In case of a fall, the kinetic energy of the falling climber must not exceed this working capacity. It is, as is well known, equal to the product of the mass ($m$) and the sum of the height of fall ($h$) and the rope elongation at point of break ($D$). The most unfavorable form of load results then, when the height of fall corresponds to the doubled rope length. In this case, $h$ equals 2 when the above-quoted kinetic energy is based per meter of rope length. The following equation, therefore, applies:

$$m \times (2+D) = P \times D \times e$$

that is, with $m$ equal to 80 kg. or about 175 lbs., $P$ equal to 1200 kg. or about 2650 lbs., and $e$ equal to 0.33, $D$ is 0.50. A lesser value, as far as 45%, is permissible, since the safety factor was set very low. With a safety factor of 0.36, an elongation at break of 45% is yielded from the calculation. In actuality, the shock load on the body, because of the damping acting in stages, will be under 1200 kg. With the load capacity of the core sheath at 1200 kg., the breaking strength of the sum of its yarns must, of course, be higher, since with a core sheath of spirally wound yarns, a strength loss of about 10% and a strength drop of about 40% through bending strain in the safety hook have to be taken into account. If, on the other hand, the absorption of a part of the shock load by the core in breaking, which is in the order of 240 kg. or 530 lbs., the rated strength of the core sheath is about 1700 kg. or 3750 lbs.

As the elongation at break of the core sheath increases, the maximum shock on a falling climber at a given kinetic energy becomes smaller. This follows from the above-mentioned relationships. A high elasticity of the core sheath, hence, is desirable. It reaches its limits in the elongation before break of the basic yarns, supplemented by a further increase in this value attributable to the design of the core sheath.

From the equation $m \times (2+D) = P \times D \times e$, when $e$ is 0.33, the equations $6m = D(P-3m)$, or $P = (6m/D) + 3m$. When $m$ is 80 kg. (175 lbs.), then $P = (480/D) + 240$. From this equation, the load capacity of the core sheath must in general have roughly the following values: 6 times the weight of the mountaineer divided by the elongation at break of the core sheath in percent plus 3 times the weight of the mountaineer. Where D is 0.80 (80% elongation at break), P is 840 kg. Because of the partial shock load absorption by the core, this value can be reduced by $3m$ or 240 kg. It can be assumed, therefore, for a usable, practical rule that $P$ equals $6m/D$ or $P = 480/D$. With all factors taken into account, $P \times D$ should not lie below 450. Here, too, of course, the tensile strength of the core sheath yarns must be correspondingly higher, as was stated above.

The mantle functions primarily to protect the core sheath against damage. No particular demands, therefore, are made on its load capacity, and a load capacity of about 300 kg. or 660 lbs. is sufficient. This capacity is not particularly critical and is easily achieved by the amount of material necessary for the covering of the core sheath.

The elongation at break of the mantle, as stated above, should in any case be less than that of the core sheath, preferably at least 20 to 30% less, so that the mantle tears before the load capacity of the core sheath is exhausted. By causing the mantle to tear before the load capacity of the core sheath is exhausted, the shock is softened by the load capacity of the mantle. This stage of shock load absorption follows the first stage wherein the low-elasticity core is torn upon exceeding its load capacity. This reduction in stages of the kinetic energy of the fall has a double advantage. Both the strain on the core sheath and the danger of bodily injury becomes less, for in this manner the maximum tolerable shock load to the human body of about 1200 kg. or 2650 lbs. at least is not exceeded. In all probability, the shock load is considerably lower.

It should further be noted that, in working with the rope during mountain climbing, the stretching capacity of core sheath and mantle is strained considerably less than the elongation at break of the core—far below 10%. The rope according to my invention, therefore, provides considerably improved serviceability.

The rope of my invention functions, therefore, in the ascent as a low-elastic rope. In a fall, the kinetic energy is consumed in three stages, since first of all the inner core in tearing absorbs in the order of 250 kg., then the mantle about 300 kg. and finally the core sheath absorbs the residual shock.

The following examples, along with FIG. 1 and FIG. 2 of the drawing, illustrate specific embodiments of ropes in accordance with my invention.

*Example 1*

Referring to FIG. 1, the iner core 1 is produced, for example, from 10 longitudinally parallel cables 2 of 7500 den. strength and 7-8% elongation at break each. The cables are made of synthetic fiber yarns of high tensile strength and low elasticity, in this case polyethylene terephthalate yarns. The cable strength is 5.7 g. per denier each—giving a total strength for the core of about 428 kg.

The core sheath 3 is made of 58 polyamide cables, under slight tension, of 7500 den. each, with a strength of 4.5 g./den. and about 35% elongation at break for each cable. The 58 cables are wound spirally in layers about the core, preferably using layers wound in both the S-direction and Z-direction.

The inner spiral winding 4 is composed of 6 cables wound side-by-side in spiral fashion in an S-direction around the inner core 1. The next spiral winding 5 is made about winding 4 in the S-direction with twelve side-by-side cables. The following spiral winding 6 is made about winding 5 in the S-direction with sixteen side-by-side cables. The outer winding 7 of the core sheath 3 is a Z-winding with twenty-four side-by-side cables.

The core sheath and mantle herein described are also described in application Ser. No. 761,408, filed September 16, 1958. The disclosure thereof is incorporated herein by reference. The length of one revolution of the spiral winding may be, as disclosed in Example 3 of said application, about 19 mm. for winding 4, about 44 mm. for winding 5, about 66 mm. for winding 6, and about 71 mm. for winding 7. In the very best rope construction, the cable layers are made up in such a way the sum of the twists of the yarns in the cables and the twists of the cables in the core sheath equal approximately zero. This gives stability against rotation in the rope under loading. Also, the twist length, the length of one revolution in the winding of the outer layer 7 falls between about 70 and 90 mm. in the best ropes.

The wound layers of core sheath 3 increase the elongaiton at break of the core sheath to 50%. They also yield stability to the rope—even without thermal fixing. The 58 cables have a calculated tensile strength of 1960 kg., which is then reduced by a winding loss factor of about 10% to about 1760 kg.

The mantle is cross-braided around core sheath in Barmen braid. It is produced, for example, from normally stretched polyamide cables of 3000 den. each, with a strength of 6.0 g. den. and an elongation at break of 22%. To cover the core sheath, the mantle composes about 40% of the total weight of sheath and mantle. Hence, 96 cables are used—giving the total tensile strength of the mantle of 1760 kg.

Through the manner of braiding, only about 33% of the total cable tensile strength can be utilized in tensile strains. A further loss of about 40% occurs in the bending in the passage through the safety hook. When all these strength reduction factors are taken into account, there remains a load capacity of the mantle of roughly 355 kg.

The gripping surface of the mantle is made rough for better gripping by using individual cables 9 and 10.

The polyamides used in accordance with this example are fiber-forming polyamides of ε-caprolactam or other lactams, polycondensates of aliphatic diamines, e.g., alkylene diamines of 4–8 carbons, and dicarboxylic acids of 4–10 carbons—the most common of which in the United States is the polycondensate of hexamethylene diamine and adipic acid—or other fiber-forming polyamides having the requisite strength and elongation characteristics for the use employed.

*Example 2*

Referring to FIG. 2, the core 11 is the same as in Example 1.

For the core sheath low-stretched polyamide cables are used of 7500 den. each, with an elongation at break of 35% and a strength of 4.5 g./den. The core sheath 12 is made of fifty cables spirally braided around the core.

Cf., Melliand-Textilberichte, pp. 406–408 (1935). The spiral braiding gives a high structural elasticity of about 45%—giving a total elasticity of about 80%. The absorption shock by the sheath is reduced to about 650 kg.—taking into consideration the load absorption by the core 11. When an experimentally determined braiding loss factor of 18% is taken into account (which corresponds to the winding loss factor in Example 1) and a loss of 40% by bending strain, a total tensile strength of the core sheath cables of 1550 kg. is necessary. This condition is abundantly fulfilled by the 50 cables at 1700 kg.

The mantle 13 is made of hemp yarn No. 1.75 interwoven of cross-braided in Barmen braid—giving an especially good gripping surface. As in Example 1, a mantle which is 40% of the total weight of sheath and mantle suffices, whereby 50 strands of hemp yarn No. 1.75 (denier 5140 den.) are used. The elongation at break of the mantle amounts to about 30%, and the load capacity is 350 kg. The mantle may also be spirally braided.

It is emphasized that all the figures mentioned are examples, and that the invention is not to be limited to these values. The rope according to the invention can also be used for other safety purposes.

Thus, my ropes are composed of (a) an inner core of longitudinally-extending, preferably straight and non-intertwisted, strands or cables having high tensile strength, low elasticity and corresponding low elongation at break, (b) a layer-wound or braided core sheath with the cables or strands spirally disposed, said sheath having high elasticity and elongation at break, and (c) a braided mantle having more elasticity than the core but substantially less elongation at break than the core sheath. For these uses, the yarns from which the core can be made include such synthetic polymers as polyethylene terephthalate, polyacrylonitrile, polypropylene and polystyrene.

The synthetic polymer for the yarns of the core sheath is preferably a nylon because of its good elasticity and elongation at break, though polymers such as polyamide and polypropylene can be used with lesser efficacy. The mantle yarns may be yarns of any suitable fiber-forming synthetic polymer or may be yarns of a natural fiber such as hemp, sisal or the like.

Briefly, the ropes of this invention are composed of an inner core of substantially straight, at most mildly intertwisted, strands or cables sufficiently strong to give the core a load capacity of at least about 250 kg. (550 lbs.) and the yarns are of the character that the core has a maximum elongation at break of about 10%. The core sheath has an elongation at break much greater than the core, preferably at least 45% and generally in the range of 0.45–0.8 (45–80%). The load capacity of the core sheath is high enough that the product of the elongation at break times the load capacity of the core sheath in kg. is at least 450. The mantle preferably has a load capacity of at least 300 kg. (600 lbs.) and has an elongation at break lower than the core sheath, most preferably at least 20–30% lower than the core sheath but more than the inner core.

The invention is hereby claimed as follows:

1. A mountaineering rope with its component strands of yarns disposed in three concentric segments which are an inner core, a core sheath about said inner core and a mantle about said core sheath, the strands of said core being longitudinally disposed along the rope axis, said core having low elasticity with a maximum elongation at break of 10% and also having a load capacity of at least 250 kg., the strands of said core sheath being spirally wound about said core, said core sheath having an elasticity which is greater than said core with an elongation at break of at least 45% and also having a load capacity sufficiently great that the product of its elongation at break times its load capacicty in kg. is at least 450, and said mantle being composed of braided strands and having an elongation at break greater than the elongation at break of said core but less than the elongation at break of said core sheath and also having a load capacity of at least 300 kg.

2. The mountaineering rope of claim 1 wherein the elongation at break of the mantle is about 20–30% less than the elongation at break of the core sheath.

3. A mountaineering rope with its component strands of yarns disposed in three concentric segments which are an inner core, a core sheath about said inner core and a mantle about said core sheath, the strands of said core being longitudinally disposed along the rope axis, said core having low elasticity with a maximum elongation at break of 10% and also having a load capacity of at least 250 kg., the strands of said core sheath being spirally braided about said core, said core sheath having an elasticity which is greater than said core with an elongation at break of at least 45% and also having a load capacity sufficiently great that the product of its elongation at break times its load capacity in kg. is at least 450, and said mantle being composed of braided strands and having an elongation at break greater than the elongation at break of said core but less than the elongation at break of said core sheath and also having a load capcity of at least 300 kg.

4. The rope of claim 1 wherein the core sheath is composed of strands spirally wound in superposed layers about the inner core.

References Cited in the file of this patent

UNITED STATES PATENTS

| | | |
|---|---|---|
| 492,582 | Maynard | Feb. 28, 1893 |
| 2,737,075 | Poirier et al. | Mar. 6, 1956 |
| 2,759,990 | Bean | Aug. 21, 1956 |

FOREIGN PATENTS

| | | |
|---|---|---|
| 19,907 | Great Britain | of 1904 |
| 825,627 | Great Britain | Dec. 16, 1959 |
| 1,146,100 | France | May 20, 1957 |